United States Patent [19]
Farrell

[11] Patent Number: 5,419,112
[45] Date of Patent: May 30, 1995

[54] GAS TURBINE POWERPLANT

[75] Inventor: William M. Farrell, Cincinnati, Ohio

[73] Assignee: General Electric Company, Cincinnati, Ohio

[21] Appl. No.: 783,030

[22] Filed: Oct. 25, 1991

Related U.S. Application Data

[62] Division of Ser. No. 361,070, Jun. 5, 1989, abandoned.

[51] Int. Cl.$^6$ ............................................. F02C 6/00
[52] U.S. Cl. .................................. 60/39.15; 290/4 A
[58] Field of Search ............ 60/39.15, 39.181, 39.182; 290/4 A, 4 C

[56]            References Cited
        U.S. PATENT DOCUMENTS

| | | | |
|---|---|---|---|
| 2,547,093 | 4/1951 | Ray | 60/39.15 |
| 2,585,576 | 2/1952 | Nicolin et al. | 60/39.15 |
| 2,663,144 | 12/1953 | Nordstrom | 60/39.181 |
| 2,688,704 | 9/1954 | Christenson | 290/4 C |
| 2,723,531 | 11/1955 | Wosika et al. | 60/39.15 |
| 2,814,181 | 11/1957 | Schwartz | 60/39.15 |
| 3,088,278 | 5/1963 | Franz | |
| 3,188,479 | 6/1965 | Wood et al. | 290/4 A |

FOREIGN PATENT DOCUMENTS

1294898  11/1972  United Kingdom

*Primary Examiner*—Richard A. Bertsch
*Assistant Examiner*—M. Kocharov
*Attorney, Agent, or Firm*—Jerome C. Squillaro; David L. Narciso

[57]            ABSTRACT

A double ender powerplant including a first engine having a compressor for producing a downstream axial flow, a combustor, a turbine coupled to the compressor through a shaft, and means for attaching a load coupled to the shaft adjacent and downstream from the turbine; a second engine having a compressor for producing a downstream axial flow, a combustor, a turbine coupled to the compressor through a shaft, and means for attaching a load coupled to the shaft adjacent and upstream from the compressor; and, a generator coupled to each of the attachment means of the first and second engines.

4 Claims, 6 Drawing Sheets

GAS TURBINE POWERPLANT

This application is a division of application Ser. No. 07/361,070, filed Jun. 5, 1989, now abandoned.

The invention relates to powerplants and, more particularly, to a powerplant incorporating a gas turbine engine.

BACKGROUND OF THE INVENTION

Gas turbine engines are used for a variety of purposes including electric utility and industrial powerplant applications. These gas turbine engines typically comprise two basic configurations. One configuration, identified as a single shaft system, uses a single compressor which is directly coupled to a single turbine and the turbine or compressor is directly coupled to a load. Alternatively, other systems utilize a free power turbine which is positioned downstream of, and is aerodynamically coupled to, the output of a turbine. These systems using a power turbine may incorporate either a single compressor which is connected to a single turbine or multiple compressors, such as a low pressure compressor which is connected to a low pressure turbine and a high pressure compressor connected to a high pressure turbine. However, in systems using a power turbine the power turbine operates independently and rotates freely of the turbine which is connected to the compressor. Each of these two configurations have their respective advantages and disadvantages. For example, in various applications, such as in marine applications it is desirable to have a large amount of stalled torque such that when the system is connected to a non-rotating load, a large amount of torque may be applied. A large quantity of stalled torque may be obtained with systems incorporating a power turbine as the engine may be operating independently of the power turbine and therefore a large amount of torque may be applied to the load through the power turbine even as the power turbine remains stationary. In contrast, single shaft systems have no stalled torque since the load is directly connected to the turbine and the compressor. Therefore, when the load is non-rotating the compressor and turbine will also not rotate and no power may be applied to the load. In these systems, large starter motors are required to rotate the compressor turbine and load in order to start the engine. However, the single shaft system has advantages over systems incorporating a free power turbine such as the performance obtained as ambient temperature increases. It is generally known that when the load is a generator, systems having a power turbine will experience a greater drop in power output than single shaft systems wherein the generator results in the rotor, and therefore the compressor and turbine, rotating at a relatively constant speed. Single shaft systems also are advantageous with respect to sudden decreases in the amount of load. In a single shaft system when the load becomes disconnected, either electrically or mechanically, from the turbine, the turbine will continue to be connected to the compressor and therefore this provides some overspeed protection. However in power turbine systems, when the load becomes disconnected, the power turbine is not connected to any other component which may limit its overspeed, such as a compressor, and therefore the power turbine is much more subject to rapid overspeed which may result in damage to the power turbine and the entire powerplant when critical stresses occur in the power turbine.

Other considerations in the development and selection of a gas turbine engine include cost, reliability and the amount of experience any gas turbine engine system has obtained. Many industrial powerplants have used engines which are derived from aircraft engines and therefore these industrial engines have benefited from much of the aircraft engine's experience and technology. Additionally the use of aircraft derived engines results in relatively lightweight engines which are particularly valuable in some applications. These aircraft engine derived systems have incorporated the use of power turbines which, while having their advantages, also have their respective disadvantages coupled with the increased cost of supplying an additional power turbine. Further, these power turbines are not typically used in the aircraft engines from which these industrial engines are derived and therefore require additional design and system modifications. These advanced aircraft gas turbine engines often utilize multiple compressors with a high pressure compressor attached to a high pressure turbine through a hollow shaft and a low pressure compressor attached to a low pressure turbine through a shaft which extends through the hollow high pressure shaft. In many applications it may be desirable to have the shaft which drives the load positioned upstream of the compressors. For example boilers may be positioned downstream of the engine for generating steam for injection into the engine. However, having the load also positioned downstream of the power turbine provides undesirable required changes to the flowpath so as to provide the air flow to heat the boilers. Unfortunately, in these advanced gas turbine designs with multiple shafts it is impractical to provide an additional shaft which extends from the power turbine through the engine such that the shaft may be connected to a load upstream of the compressors. Additionally, aircraft derivative engines typically require modifications to the turbine so as to match changes in air flow and other changes often include nozzle area changes and modifications of the number of compressor stages. Whenever changes or modifications are require from the existing aircraft engine design this requires design and manufacturing changes which result in increased expense and result in additional reliability considerations corresponding to the use of configurations which have not benefited directly from the reliability, testing and experience obtained from the respective aircraft engine.

Therefore it would be desirable to have a system which avoids the disadvantages of the single shaft and power turbine configurations while retaining many of their respective advantages. Further, it would be desirable to have a system which minimizes modifications required in existing aircraft engine technology.

SUMMARY OF THE INVENTION

A powerplant comprising a first compressor for producing a downstream axial flow, a second compressor positioned downstream of said first compressor and combustor positioned downstream of said second compressor. A first turbine is positioned downstream of said combustor and said first turbine is drivingly connected to said second compressor through a first shaft. A second turbine is positioned downstream of said first turbine and said second turbine is drivingly connected to said first compressor through a second shaft. The powerplant has a means for providing a load wherein the load is primarily rotary as opposed to a downstream axial thrust and said load means is coupled to said second shaft.

The invention also includes an engine for a non-aeronautical application comprising a first compressor for producing a downstream axial flow, a second compressor positioned downstream of said first compressor, and a combustor positioned downstream of said second compressor. A first turbine is positioned downstream of said combustor and said first turbine is drivingly connected to said second compressor through a first shaft. A second turbine is positioned downstream of said first turbine and said second turbine is drivingly connected to said first compressor through a second shaft. The powerplant has a means for coupling a load to said second shaft.

Further the invention includes a method of converting an aircraft turbofan engine having a fan, and a compressor for producing a downstream flow adjacent said fan, to a non-aeronautical application comprising the steps of removing a fan from a shaft of said engine and attaching a means for coupling a load to the shaft from which said fan is removed.

DETAILED DESCRIPTION OF PREFERRED EMBODIMENTS

Figure 1:
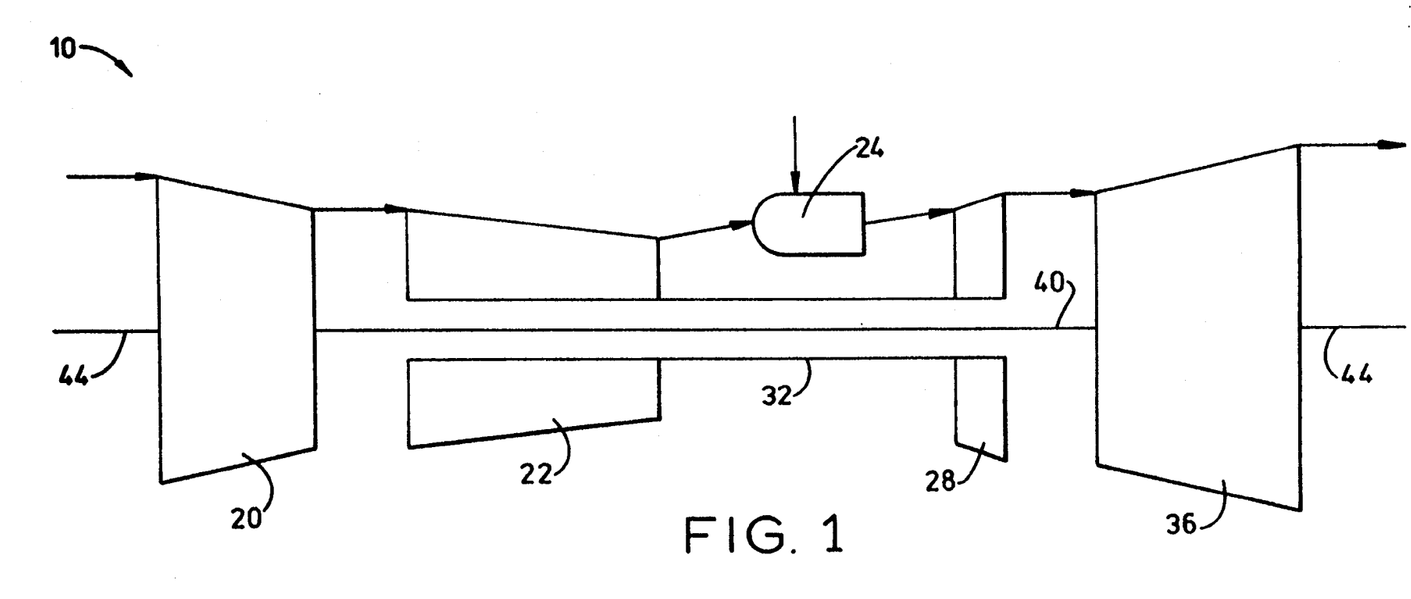
FIG. 1 is a schematic diagram of one embodiment of the invention.

In FIG. 1, a powerplant 10 of the present invention comprises an engine for a non-aeronautical application having a first compressor 20 for producing a downstream axial flow and a second compressor 22 positioned downstream of the first compressor 20. A combustor 24 is positioned downstream of the compressor 22 and a first turbine 28 is positioned downstream of the combustor 24 and is drivingly connected to the second compressor 22 through a first shaft 32, and a second turbine 36 is positioned downstream of the first turbine 28 and the second turbine is drivingly connected to the first compressor 20 through a second shaft 40. The powerplant has a means 44 for coupling a load to the second shaft 40. Preferably, the load which is coupled to the second shaft 40 is primarily rotary as opposed to a downstream axial thrust.

Figure 2A:
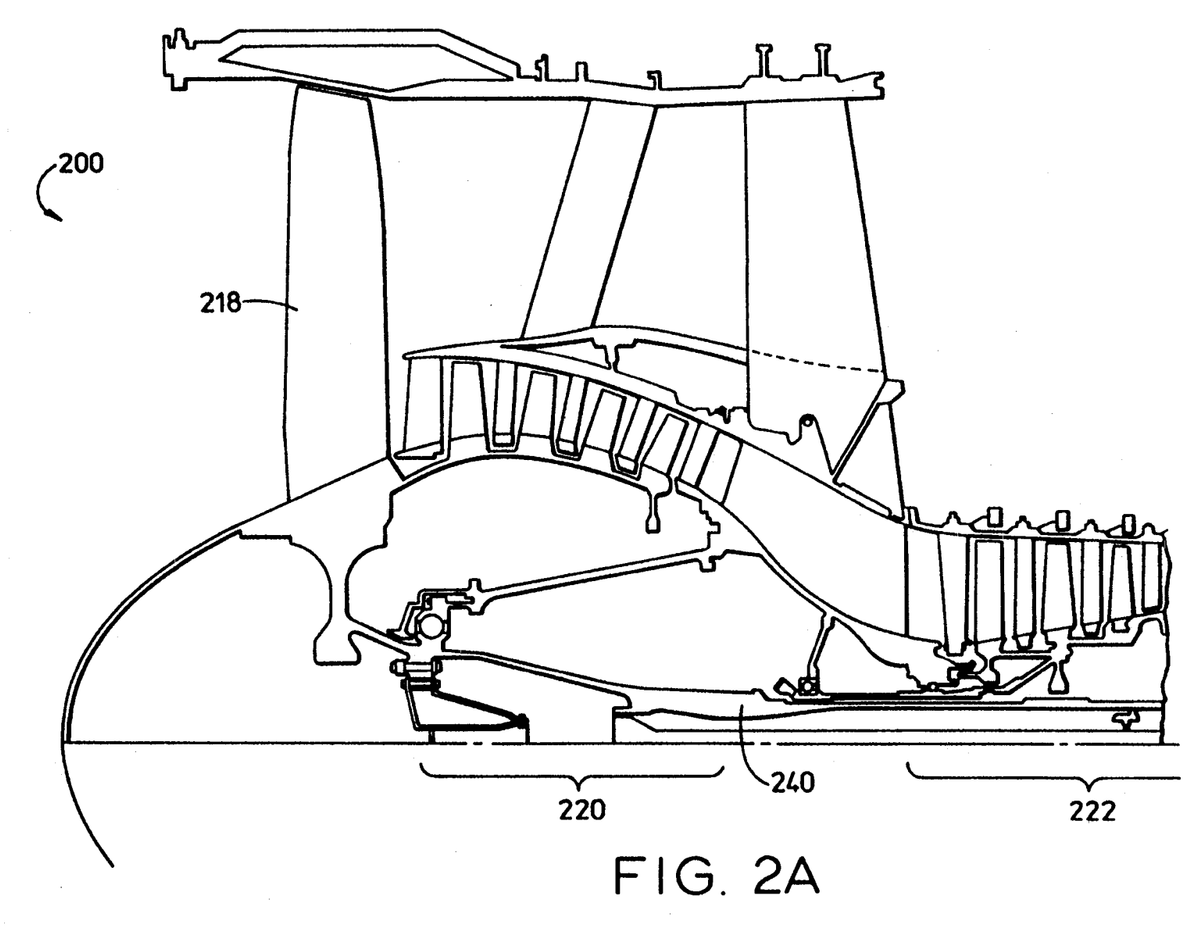
FIGS. 2A and 2B are cross-sectional diagrams of an aircraft gas turbine engine.
Figure 2B:
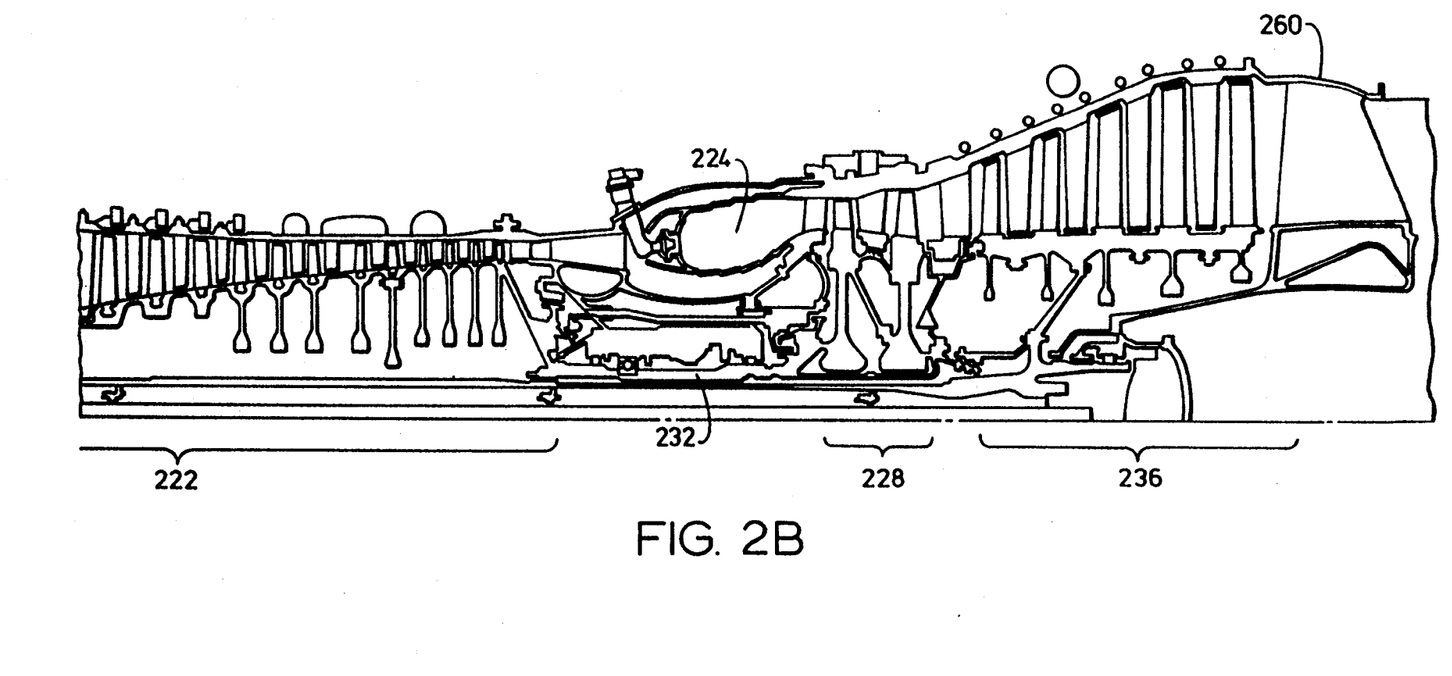

The first and second compressors, 20 and 22 respectively, the combustor 24, the first and second turbines 38 and 36 respectively, and the first and second shafts 32 and 40 respectively are preferably formed from an aircraft engine such as a CF6-80C2 engine as provided by General Electric Company as depicted in FIGS. 2A and 2B, wherein the aircraft engine 200 has a fan 218 which produces a downstream axial flow, a first compressor 220 is positioned downstream of the fan 218 a second compressor 222 is positioned downstream of the first compressor 220, a combustor 224 is positioned downstream of the second compressor 222, a first turbine 228 is positioned downstream of the combustor 224 and is drivingly connected to the second compressor 222 through a first shaft 232, a second turbine 236 is positioned downstream of the first turbine 228 and is drivingly connected to both the first compressor 220 and the fan 218 through a second shaft 240. Typically the first compressor 220 has one end of the first compressor 220 coupled to the second shaft 240 through the fan 218. Generally, downstream of the second turbine 236 is a cylindrical rear frame 260 which typically has deswirling type struts to which a gas turbine nozzle is typically attached as is well known in the art. The rear frame 260 curves toward the axial center of the engine downstream of the second turbine.

Figure 3A:
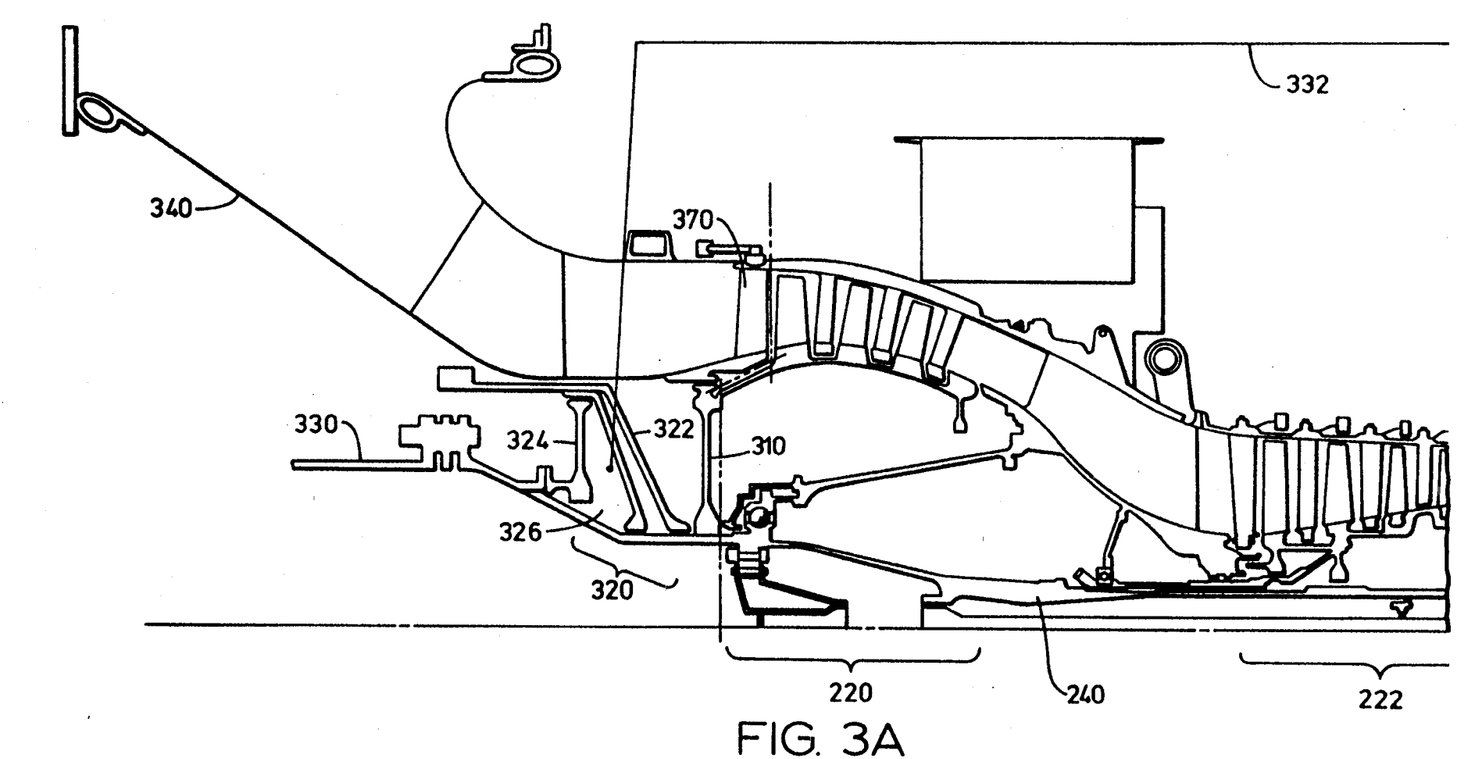
FIGS. 3A and 3B are cross-sectional diagrams of one embodiment of the present invention.
Figure 3B:
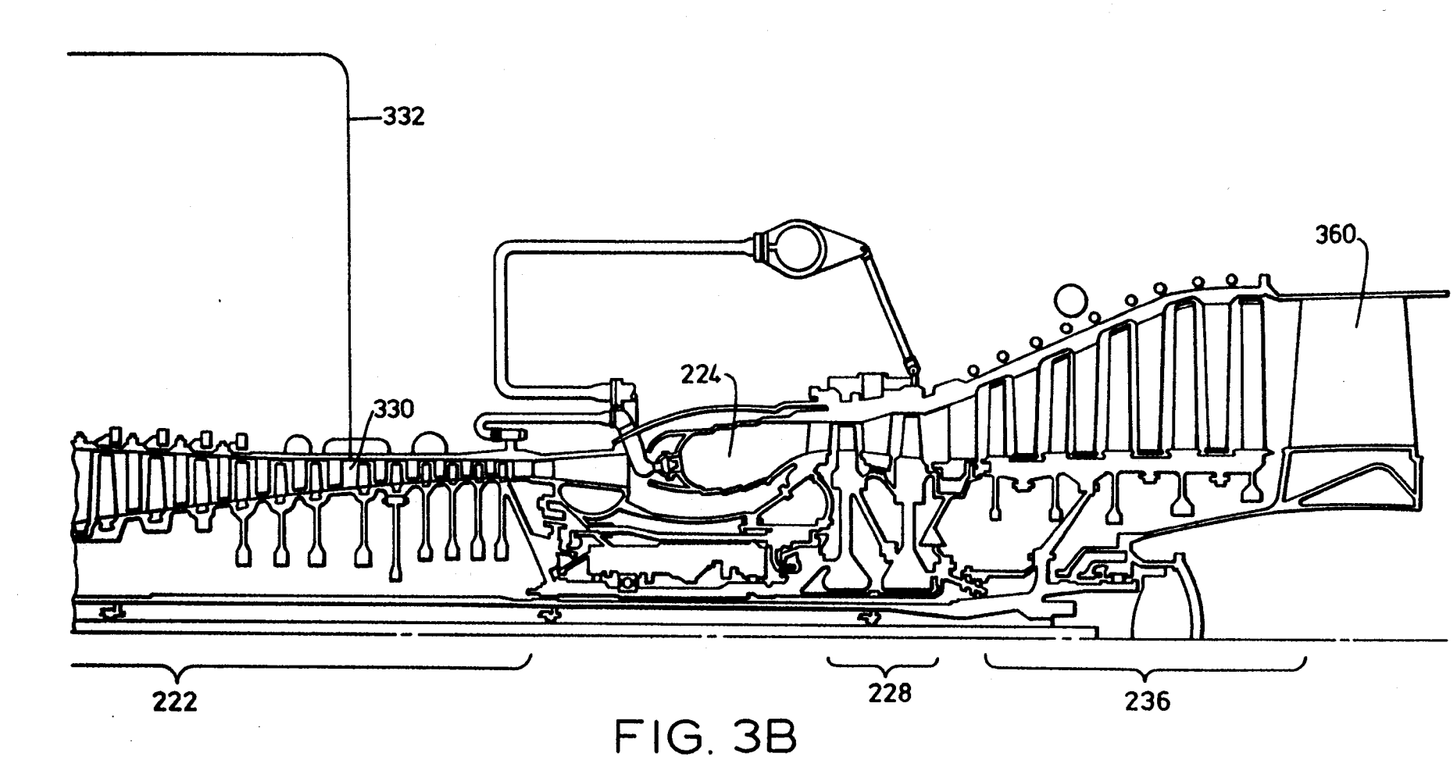

In FIGS. 3A and 3B, a modified gas turbine engine is depicted wherein like numerals correspond to like elements of FIGS. 2A and 2B. It should be understood that preferably any modifications made to the engine are either upstream of the first compressor 220 or downstream of the second turbine 236 thereby providing minimal changes to the aircraft engine. However, it may be desirable to interchange the existing blades in the first compressor 220 with alternate blades to maximize efficiency to accommodate for changes in air flow characteristics. Preferably only the air foil shape is modified and all other components of the compressor such as blade attachment and locking means, or the actual flow path will remain unchanged. Upstream of the first compressor 220 the fan 218 will be removed and typically a disk 310 will be connected from the second shaft 240 to the first compressor 220 to provide support and drive for the first compressor 220. A balance piston 320 is preferably positioned upstream of the first compressor 220 and is typically formed by a first member 322 which is connected to an inlet casing 340 and the first member extends to the second shaft 240 having a seal positioned therebetween. It may be desirable to form the first member such as to form a two seal and vent cavity system in which a first sidewall extends from the inlet casing 340 to a first seal adjacent the second shaft 240, and a second sidewall spaced apart from the first sidewall and extends from the inlet casing to a second seal which is positioned adjacent the second shaft 240 thereby forming an aperture therebetween which may be coupled through piping away from the engine. Alternatively, the first member 322 may be formed by use of a triple seal which forms two cavities. The first cavity being a venting cavity and the second cavity is coupled to a source of low temperature low pressure air. The balance piston 320 also typically has a second member 324 connected to the second shaft 240 and extending toward and positioned upstream of the first member 322 and positioned such as to form a cavity 326 between the first and second members, 322 and 324 respectively. Typically, air from a bleed valve 330 of the second compressor is coupled into the cavity by piping 332 and this air exerts an upstream force on the second shaft 240 to compensate for the removal of the fan 218. A flange 330 is also connected to the second shaft 240 to serve as a means for coupling a load to the second shaft 240. It should be understood that the balance piston 320 or the means for coupling a load to the shaft may also be positioned aft of the second turbine 236 however, to avoid the higher temperature considerations it is typically desirable to position these components forward of the first compressor 220. A variable inlet guide vane 370 is also positioned prior to the first compressor 220 to control air flow therethrough and upstream of the guide vane 370 is an inlet casing 340 for air intake into the compressor 220.

The modifications aft of the second turbine are also typically minimal, preferably the rear frame 260 is typically replaced with a modified rear frame 360 having a diameter which either increases or has an approximately constant diameter downstream of the turbine.

It should be understood that the aircraft turbofan engine is modified during the design phase to form the non-aeronautical engine. Therefore, typically it is the design process which will remove the fan and make the other changes necessary to the aircraft engine and during the actual assembly of the non-aeronautical engine, the engine will be assembled in accordance with the plans which already have incorporated the conversion modifications.

In operation air enters through the inlet casing 340 and passes through the inlet guide vane 370 to first compressor 220 and then flows downstream through the second compressor 222. The air is then heated by the combustor 224 which then powers the first and second turbines 228 and 236 respectively. The turbines drive the first and second shafts 232 and 240 respectively. The first shaft 232 drives the second compressor 222 and the second shaft 240 drives the first compressor 220 and the load which is coupled to flange 330. Typically, the load is primarily rotary as opposed to downstream axial thrust. For example, the load may be a generator, a compressor for an industrial application, or a shaft coupled to gearing such as for marine propulsion. Therefore, horsepower which is typically used to power bypass air in a turbofan engine may be used to power directly non-fan or non-propeller applications. Further, as turbofan efficiency increases with technology, these efficiency increases will be directly and easily be converted to non-aeronautical applications, particularly when higher by-pass flows are used to obtain these efficiencies. Additional horsepower is also obtained by replacing the rear frame 260 with a modified rear frame 360 having a diameter which either increases or remains approximately constant downstream of the turbine. In aircraft engines the outer flow path wall of the rear frame curves inward toward the center of the engine to compensate for reductions in velocity resulting from the deswirling struts. However, in marine or industrial applications there is no need to compensate for any reductions in velocity and in these applications typically a diffuser is used to lower velocity to obtain a larger pressure drop across the turbine for increased output and the modified rear frame 360 provides for this reduction in velocity.

The balance piston 320 compensates for the downstream axial forces which occur when the fan 218 is removed from the second shaft 240. The balance piston may also incorporate techniques to reduce the injection of warm air in the engine flowpath due to the leakage of balance piston pressurized air from the inner seal. For example, in a double seal with vent cavity system warm air which enters the cavity may be vented outside the engine flowpath. Alternatively, in a three seal and vent cavity system warm air may vented outside the engine flow path and cool low pressure air may enter the second cavity to further reduce the temperature of any air entering the engine flowpath.

Figure 4:
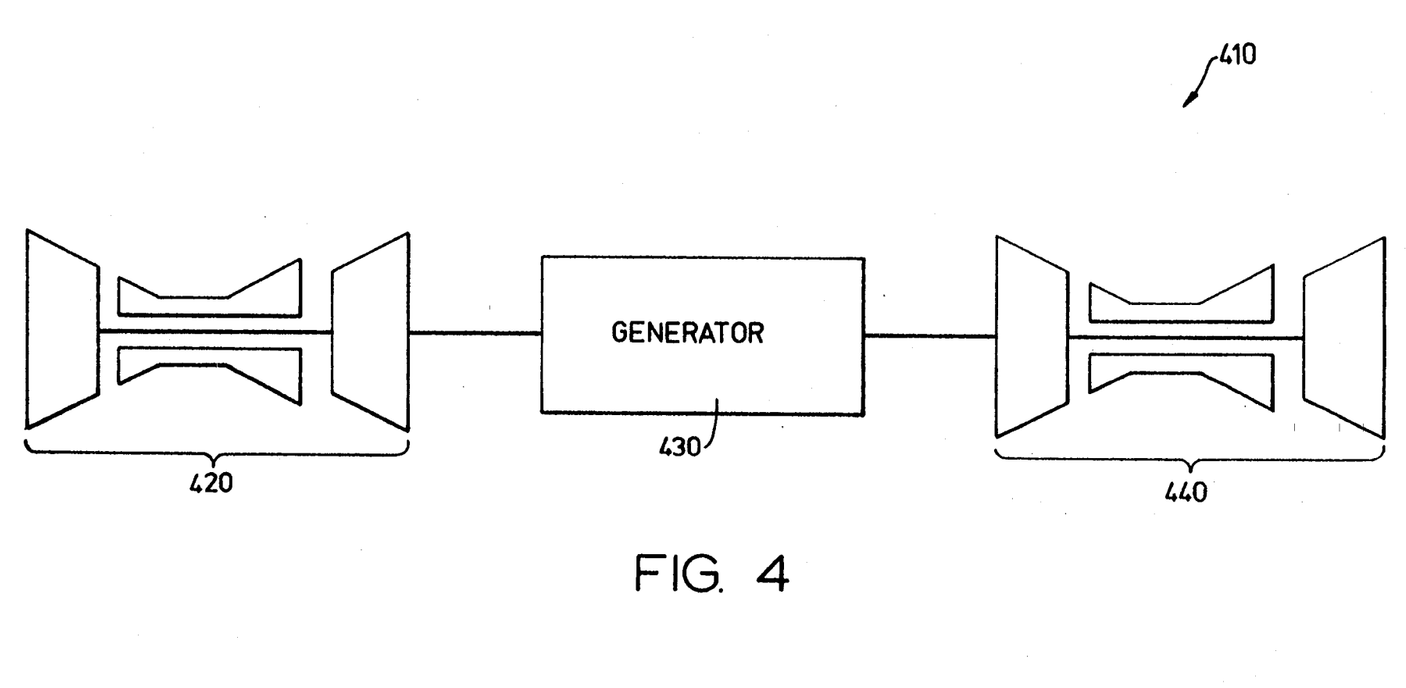
FIG. 4 is a schematic diagram of "double ender" powerplant configuration utilizing the present invention.

The "direct drive independent core" powerplant of the present invention provides numerous advantages over other industrial and marine engines. For example, as compared with single shaft systems which have zero stalled torque the present design may provide a substantial amount of torque as the second compressor 222 and the first turbine 228 and shaft 232 will rotate independently of the second shaft 240 to which the load is connected thereby enabling torque to be supplied to the load. The powerplant is also useful in that it is often desirable to let the engine motor to cool itself at very low speed and this is easily accomplished in the present invention as one compressor and turbine may rotate freely of the load, however in single shaft systems this may require a large amount of power to drive the load. Further, in systems in which the load is a generator it is likely that the present invention will provide improved performance output as ambient temperature increases as compared to power turbine systems. In the present system, a generator load will be coupled to the first compressor through the second shaft and the generator will therefore result in the first compressor introducing a relatively constant flow of air into the engine which should reduce the adverse affects of increases in ambient temperature. Additionally, the present invention also provides some overspeed protection when the load becomes disconnected from the shaft as the second turbine 236 will also be coupled to the first compressor 220 thereby serving to limit overspeed. The present system also provides a system which utilizes advanced gas turbine design and also provides a system in which the load may be attached upstream of the compressors thereby avoiding required modifications to the direction of the air flow which may be caused by a system in which the load is downstream. Further, the system can be also used such that the load may be positioned downstream of the turbine which may be desirable in particular applications such as for marine propulsion. This option of attaching the load either upstream of the compressors or downstream of the turbine provides the ability to use the gas turbines in a matched system such as for use in a "double ender" generator system 410 in which as shown in FIG. 4 a first powerplant 420 is connected to a generator 430 downstream of the turbines 424 and 425 of the first powerplant 420 and the generator 430 is also coupled to a second powerplant 440 upstream of the first compressor 441 of the second powerplant.

It should be understood that first powerplant 420 preferably includes first and second compressors 421 and 422, a combustor 423, and first and second turbines 424 and 425 as previously described herein. First powerplant 420 further includes a shafting arrangement 426, wherein a pair coaxial concentric shafts 427 and 428 couple second compressor 422 to the first turbine 424 and the first compressor 421 to the second turbine 425, respectively. Thereafter, means 431 for attaching the generator 430 to first powerplant 420 downstream of the second turbine 425 through shaft 428 is provided.

Likewise, second powerplant 440 includes first and second compressors 441 and 442, a combustor 443, and first and second turbines 444 and 445. A shafting arrangement 446 is also provided like that in first powerplant 420, wherein a pair of coaxial concentric shafts 447 and 448 couple the second compressor 442 to first turbine and first compressor 441 to the second turbine 445, respectively. Means 432 is provided for attaching the generator 430 upstream of the first compressor 441 through shaft 448. Previously, identical powerplants were positioned on each side of the generator and power turbines were actually coupled to the generator. The use of power turbines requires that one of the power turbines rotate in the reverse direction as the other power turbine. This reverse rotation therefore requires modification in the design and the tooling for one of the power turbines and modifications which therefore results in increased expense. However, in the present system the same engine may be utilized with the differences existing primarily only in the front and rear attachment to the generator. The present invention is particularly advantageous in its ability to use a maximum amount of currently available aircraft engine design with a minimum amount of change. By minimizing the changes to an aircraft engine to primarily either in front of the first compressor 220 or aft of the second turbine 236 changes to the flowpath are minimized and maximum benefit of the experience in reliability and proven technological designs can be utilized. Further, this minimizes additional design modifications with the respective costs which are necessarily associated with these changes. Additionally, this design also provides significant cost improvements associated with the elimination of the use of a power turbine.

I claim:

1. A double ender powerplant, comprising:
   (a) a first engine having a compressor for producing an axial flow downstream therefrom, a combustor, a turbine which is coupled to said compressor through a first shaft, and means for attaching a load coupled to said first shaft adjacent and downstream from said turbine;
   (b) a second engine having a compressor for producing an axial flow downstream therefrom, a combustor, a turbine which is coupled to said compressor through a second shaft and a means for attaching a load to said second shaft adjacent and upstream from said compressor; and
   (c) a generator which is coupled to said attachment means of said first and second engines.

2. A double ender powerplant, comprising:
   (a) A first powerplant including:
      (1) a first compressor for producing an axial flow downstream therefrom;
      (2) a second compressor positioned downstream of said first compressor;
      (3) a combustor positioned downstream of said second compressor;
      (4) a first turbine positioned downstream of said combustor drivingly connected to said second compressor through a first shaft;
      (5) a second turbine positioned downstream of said first turbine drivingly connected to said first compressor through a second shaft, said second shaft and said first shaft being in concentric arrangement and rotating independently of each other; and
      (6) means for attaching a load coupled to said second shaft adjacent and downstream of said second turbine;
   (b) A second powerplant including:
      (1) a first compressor for producing an axial flow downstream therefrom;
      (2) a second compressor positioned downstream of said first compressor;
      (3) a combustor positioned downstream of said second compressor;
      (4) a first turbine positioned downstream of said combustor drivingly connected to said second compressor through a first shaft;
      (5) a second turbine positioned downstream of said first turbine drivingly connected to said first compressor through a second shaft, said second shaft and said first shaft being in concentric arrangement and rotating independently of each other; and
      (6) means for attaching a load coupled to said second shaft adjacent and upstream of said first compressor; and
   (c) a generator which is coupled to said attachment means of said first and second powerplants.

3. The double ender powerplant of claim 2, wherein said first and second powerplants are identical except for the location of their respective attachment means.

4. The double ender powerplant of claim 2, wherein said first and second powerplants are aligned coaxially.

* * * * *